United States Patent [19]

Taylor, Jr.

[11] Patent Number: 4,749,994
[45] Date of Patent: Jun. 7, 1988

[54] SIGNAL PROCESSING FOR RADARS HAVING CLUTTER MAPS

[75] Inventor: John W. Taylor, Jr., Baltimore, Md.

[73] Assignee: Westinghouse Electric Corp., Pittsburgh, Pa.

[21] Appl. No.: 870,583

[22] Filed: Jun. 4, 1986

[51] Int. Cl.⁴ ............................................. G01S 7/44
[52] U.S. Cl. ...................................... 342/195; 342/93
[58] Field of Search ............... 342/194, 195, 162, 159, 342/89, 90, 91, 92, 93, 137, 139, 146, 160, 162, 197

[56] References Cited

U.S. PATENT DOCUMENTS

| | | | |
|---|---|---|---|
| 3,325,806 | 6/1967 | Wilmot | 342/90 |
| 3,705,936 | 12/1972 | Wilmot | 342/90 |
| 3,727,218 | 4/1973 | Cantwell, Jr. et al. | 342/195 |
| 3,849,780 | 11/1974 | Dynan . | |
| 3,906,498 | 9/1975 | Taylor, Jr. | 342/137 |
| 3,940,762 | 2/1976 | Ethington et al. | 342/90 |
| 4,068,231 | 1/1978 | Wilmot | 342/159 |
| 4,104,633 | 8/1978 | Donahue et al. . | |
| 4,122,450 | 10/1978 | Kowalski et al. | 342/159 |
| 4,137,532 | 1/1979 | Taylor, Jr. et al. . | |
| 4,151,523 | 4/1979 | Platt et al. | 342/159 |
| 4,270,127 | 5/1981 | Clark, Jr. . | |
| 4,339,752 | 7/1982 | Williams et al. . | |
| 4,488,154 | 12/1984 | Ward | 342/162 |
| 4,542,382 | 9/1985 | Hol | 342/167 |
| 4,636,793 | 1/1987 | D'Addio et al. | 342/162 |

*Primary Examiner*—T. H. Tubbesing
*Assistant Examiner*—Gilberto Barrón, Jr.
*Attorney, Agent, or Firm*—W. G. Sutcliff

[57] ABSTRACT

Method for determining and using clutter estimates in a radar clutter map. The method does not require synchronization of the transmitted radar pulses with the azimuth coordinates of the map cells. Data inputs close to each map azimuth location are used to estimate the echo amplitude in the map cell which would result if the antenna beam was pointing directly at the clutter when one data sample occurred. A burst of pulses are transmitted and return echoes are processed to produce clutter signals at least twice within the time it takes for the antenna to scan one beamwidth. Clutter echoes received adjacent in azimuth to the map cell for which the value is being calculated are converted by a formula into a value for adjusting the present map cell value. The formula takes into consideration the magnitude of the values, the difference between the values, the antenna beam width, and the azimuth spacing of the samples. The map values are outputted for threshold level control by other techniques including the selection of the larger of the two stored cell values straddling the azimuth of the threshold controlled signal.

15 Claims, 2 Drawing Sheets

SIGNAL PROCESSING FOR RADARS HAVING CLUTTER MAPS

BACKGROUND OF THE INVENTION

This invention relates, in general, to radar systems and, more specifically, to methods for storing and retrieving information using radar clutter maps.

Many radar systems use clutter maps to reduce false alarms from ground clutter echoes and to provide the capability of detecting aircraft or other targets moving on tangential paths with respect to the radar equipment location. Clutter maps also provide for superclutter visibility, that is, the detection of targets whose echoes are substantially stronger than the mean clutter echo from that spatial location, and for interclutter visibility, that is, the detection in gaps within the clutter area.

The nature of clutter echoes is well known according to the prior art. Usually, clutter echoes vary slowly in amplitude due to movements of foliage, swaying of towers in the wind, or changes in radar frequency. Therefore, the clutter map must average many scans of data to obtain a good estimate of the mean clutter amplitude in each range-azimuth cell of the clutter map. Each rangeazimuth cell of the clutter map corresponds to a specific physical location or area, remote from the radar system antenna, in which it is desirable to detect targets. Once the data has been put into the map cell, the radar processing system must establish a detection threshold for the echoes from the corresponding range and azimuth location which is sufficiently above the mean cell value to maintain an acceptable false alarm probability caused by the fluctuating clutter. It is also necessary to average the inputs to the clutter map over many scans to reduce the effect of a moving target on the map values.

In order to make the data in the clutter map correspond to the physical locations scanned by the radar antenna, prior art clutter maps have attempted to synchronize the transmissions of the radar systems with the designated azimuth cells in the clutter map. Clutter maps are usually associated with moving target detector (MTD) radar systems wherein a series or burst of radar pulses are transmitted from the radar system in order to get meaningful return echoes. According to the prior art, the burst of pulses had to be synchronized in so far as possible with the location of the clutter map cells in order to make the values put into the map cells accurate and consistent with the actual clutter conditions existing in the corresponding locations. Because of this requirement, conventional practice has been to synchronize the transmitted radar pulses with the physical azimuth position of the radar antenna. However, the instantaneous scan rate of the antenna can vary as a function of the frequency of the power source driving the antenna, the voltage of the power source which affects the slip of the antenna, and upon wind and ice conditions existing at the antenna environment. Although all of these parameters can be estimated to a certain degree of accuracy, exact analysis and predictability is not possible. Therefore, other methods to adequately synchronize the transmitted pulses with the position of the radar antenna have been used.

One method of synchronizing the transmitted pulses with the scan rate of the antenna has made use of extra transmitting pulses which can be used when the "worst case" conditions do not exist. A worst case condition is characterized by the longest period for transmitting the pulses and the highest scan rate of the antenna. While these extra pulses can be used to synchronize the system under usual and normal operating conditions the extra pulses are wasted. Typical parameter variances allow for a five percent variation in the pulse repetition frequency of the transmitted signal and a ten percent variation in the scan rate of the antenna. When considering both positive and negative variations, a total of thirty percent of the transmitted pulses can be wasted under certain conditions. This is an economic waste of transmitter power and equipment which is difficult to justify.

Even with a "worst case" analysis, it is possible for the parameters to be such that the additional pulses provided by the radar transmitter are not sufficient to keep the transmissions synchronized with the antenna azimuth position. Therefore, a catastrophic failure of synchronization occurs in that the information from the radar echoes cannot be put into the proper range-azimuth cell of the clutter map. The use of extra pulses provides no means for compensating or handling this type of system failure. A failure to synchronize also creates an intolerable increase in clutter alarms and overloads the signal processing system.

Frequently, the radar transmission consists of a burst of pulses of constant frequency and interpulse spacing and the processing of the return echoes creates a multiplicity of doppler filters. The one or two filters which pass zero doppler echoes use the clutter map to set their detection threshold. The other filters suppress the clutter signals, but to a finite degree. When the clutter map indicates clutter amplitudes too strong to be completely suppressed by the other filters, the clutter map may be employed to raise the detection thresholds in those filters.

During the time required for the antenna to scan across the target, the typical MTD radar system transmits two or more bursts having different interpulse periods to eliminate blindness to certain dopplers (multiples of the pulse repetition frequency). Usually, the interpulse periods do not allow all of the echoes from rain at high altitude to be received prior to the next transmission. Unfortunately, the curvature of the earth does not prevent reception of strong interference from this second-timearound rain clutter and similar problems can be created by mountains in the distance, or by abnormal refraction conditions. Consequently, radars having interpulse periods shorter than one millisecond must provide means for suppressing second-time-around clutter.

The use of multiple PRF bursts is one method of suppressing such undesirable clutter signals. In order to transmit multiple PRF bursts, it is necessary to change the interpulse period between adjacent pulses in the burst transmission. Conventional practice is to have the interpulse period change when the antenna azimuth passes a map azimuth, and to compute the doppler filter outputs based on the prior interpulse periods of data. Since the azimuth change pulses which dictates the interpulse change occurs at any point within an interpulse period, there is a jitter in the azimuth of the burst of transmitted signals. Although this jitter does not create significant amplitude variation in the sample of point clutter closest to the azimuth of the clutter, those samples on the skirts of the antenna beam are modulated to an extent which demands that the detection threshold be raised more than anticipated above the stored map data in order to control clutter alarms. Therefore, it is desirable, and it is an object of this invention, to provide a system which yields a suitable safety margin on the skirt samples of the clutter echoes without raising the margin of the nose samples.

It is also desirable, and it is another object of this invention, to provide a means for using a radar clutter map which does not require extra and wasted transmitted pulses, and which eliminates the catastrophic effect experienced by prior art systems when the system parameters vary over a wide range.

SUMMARY OF THE INVENTION

There is disclosed herein a new and useful method for coordinating the data in a radar clutter map with the clutter existing at the actual area scanned by the radar system. According to this new method, the burst transmissions from the radar occur asynchronously with the position of the antenna. Specific techniques are used to process the received data for loading into, and later retrieval from, the clutter map cells. Since the transmitted pulses are not precisely synchronized with the antenna positions or map cells, no extra pulses are used.

According to a specific embodiment of this invention, the transmitted radar signal includes a first burst of pulses having one pulse repetition frequency, and a second burst of pulses having another pulse repetition frequency. Both bursts of pulses are transmitted within the approximate time required for the antenna to scan one beamwidth. The cells of the clutter map have approximately the same quantization interval as the transmitted pulses. The method of this invention provides an adequate estimate of the amplitude of the point clutter at the azimuth of that clutter, using the returned echo data samples on either side of the clutter azimuth. According to one specific embodiment, the process assumes that a peak occurs between the two samples, so it develops an estimate slightly larger than either of the data samples. On the skirts of the beam where one sample is much larger than the other, it essentially picks the larger of the two which has the desired effect of producing a safety margin on the skirts of the beam so that the modest jitter between map azimuth and data azimuth can be tolerated. Near the nose of the beam, the larger of the two data samples straddling the map azimuth is selected and a small correction is added depending upon the antenna beamwidth, the spacing of data samples in azimuth, and the difference between the two data samples.

The system of this invention can provide two different combinations of stored map data since the scanning antenna produces a broader cluster of residue from the filters which suppress zero doppler than from those which pass zero doppler. Since the data stored into the map originally was accomplished without synchronization of the map cells to the pulses actually transmitted, a specific technique must be employed to use the stored data to adequately estimate the clutter at a particular azimuth. For filters which pass zero doppler, the map output is derived by the use of several slightly different techniques. According to one embodiment, the larger of the two stored data samples straddling the azimuth is selected. According to another embodiment, the stored data closest to the azimuth of the filter data is utilized. Still another embodiment makes use of the average, in power, voltage, or LOG, of the two stored data samples straddling the azimuth. A final embodiment makes an estimate based upon three or more stored data samples closest to the azimuth. In filters which suppress zero doppler, the detection threshold is raised when the clutter map indicates clutter echoes which are too strong to be suppressed below noise level. The clutter residue created by the scanning antenna extends over about two beamwidths because clutter on the skirts of the beam creates echoes which, although weak, are changing amplitude more rapidly than near the nose of the beam. Therefore, the effect of the peak measurement of clutter is spread to adjacent azimuths.

An advantage of the present invention is that, if clutter data is available at azimuth intervals of approximately half a beamwidth and is stored at comparable spacings, it is unnecessary to synchronize the burst transmissions of the radar to precise azimuths. The elimination of a need to synchronize transmissions with azimuth avoids two serious problems of prior methods. These are the waste of up to thirty percent of the average power of the transmitter created by not utilizing all of the received echoes, and the catastrophic effects created when synchronization fails due to extreme combinations of wind, voltage, and frequency.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figures 1, 3:
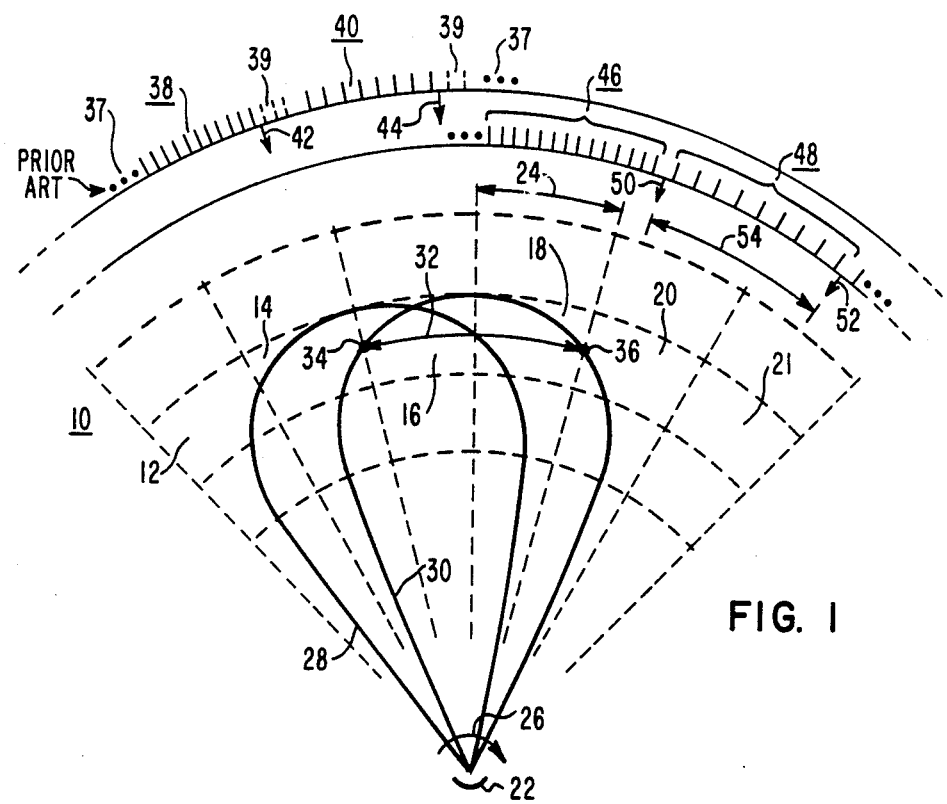
FIG. 1 is a diagram illustrating the relationships between the clutter map cells, the antenna beam positions, and the transmitted pulses for both the prior art and the present invention.
FIG. 3 is a graph illustrating typical values of quantities used by the method of this invention.

Referring to the drawings, and to FIG. 1 in particular, there is shown a physical representation of a clutter map in relation to the transmitted pulses and the antenna beam pattern. The clutter map 10 includes a plurality of range-azimuth cells which correspond to actual areas from which the radar system may receive clutter signals. Map cells 12, 14, 16, 18, 20 and 21 correspond to locations which are at the same range for the radar antenna 22, but at different azimuths. Other map cells are located at different azimuths and ranges.

The actual spacing of the map cells may be different than that shown in FIG. 1. For example, the angular spacing 24 of the map cells shown in FIG. 1 may, in actual systems, be 0.7 degrees which would provide 512 map cells at the same range for 360-degree radars. In actual hardware, the radar clutter map is merely a digital memory device whose values are stored and altered in specific locations which correspond to the range-azimuth cell scanned by the radar system. Although shown in FIG. 1 as an area encompassing a finite amount of range and azimuth variations, the value stored in the clutter map is used for all the clutter within each range-azimuth cell, with the value normally representing the strongest of the clutter observed throughout the cell.

As the antenna rotates in the direction 26, the radiation pattern of the antenna rotates across the areas being observed by the radar. Antenna pattern 28, shown in FIG. 1, represents the gain of the antenna when pointed at a particular azimuth, and the radiation pattern 30 represents the gain of the antenna when pointed in another azimuth direction after rotating in the direction 26. The decrease in gain of the antenna for signals received on each side of the center line of the antenna pattern reduces the amplitude of the returned echoes when the antenna is not pointed directly at the source of the clutter. Since the object of this invention is to be able to determine clutter map values from transmitted pulses which are not synchronized to the rotation of the antenna 22, additional techniques are required to make the received signal over the beamwidth of the antenna closely correspond to the actual clutter values which should be stored in the map cells.

The beamwidth of the antenna system operating with the radar is important to the proper functioning of this invention. The beamwidth of the antenna is the angular distance between points on the gain curve of the antenna wherein the response is down 3 dB from the peak gain. Since many radar systems employ the same antenna for transmitting and receiving, 3 dB down on both the transmission and reception paths translates to a beamwidth at the 6 dB points on the antenna curve. Thus, the 6 dB two-way beamwidth of the antenna 22 shown in FIG. 1 may be represented by the angular spacing 32 between the beam pattern points 34 and 36 which are 6 dB down from the maximum gain. To satisfy a requirement for proper operation of the system of this invention, the antenna beamwidth must be on the order of two times the angular spacing between successively received clutter signals. A typical system could have the angular spacing 32 equal to 1.6 degrees.

The burst, series, or grouping of pulses 38, and the burst 40 which has a different pulse repetition frequency than burst 38, represent the transmitted pulses from a radar constructed according to the prior art wherein the bursts are synchronized with the azimuth of the map cells. The dots 37 indicate that similar pulses bursts occur for other azimuths of the clutter map. The dashed pulses 39 represent wasted pulses which are not processed in the doppler filters under ordinary and usual operating conditions. As can be seen in FIG. 1, burst 38 is angularly in the same position with respect to map cell 14 as burst 40 is with respect to map cell 16. In such a system, there would be the same number of bursts occurring during a complete rotation of the radar antenna as there are map cells traversed during a complete rotation of the antenna. In other words, there is a one-to-one relationship between the number of clutter values processed from the transmitted bursts with the number of cells in the clutter map at the same azimuth. Arrows 42 and 44 symbolize the return of the echo signals from the transmitted pulses and are actually a result of processing the returned echoes from the complete series of pulses. It is emphasized that for each series or burst of pulses, both according to the prior art and to the present invention, clutter values for map cells at different ranges are determined based upon the length of time between each transmitted pulse and the echo received by the radar antenna.

Transmitted bursts of pulses, such as bursts 46 and 48 shown in FIG. 1, represent the transmitted signal from the radar system according to the present invention. The arrows 50 and 52 symbolize the clutter signals which the processor acquires from a reception of the returned echoes from the pulse signals. As can be seen in FIG. 1, the angular spacing and location of the transmitted bursts of pulses according to this invention, such as bursts 46 and 48, and the change in interpulse period are not synchronized with the azimuth of the clutter map cells. The return echoes, represented by arrows 50 and 52, are not aligned identically in azimuth with a corresponding map cell. As shown, arrow 52 is more toward the center of a map cell than is arrow 50. In this specific embodiment, pulse burst 46 has a higher pulse repetition frequency than does pulse burst 48.

As the antenna 22 rotates repeatedly throughout its 360 degrees of rotation, the returned echo signals according to the present invention vary with respect to the boundaries of the map cells. Therefore, as will be described more completely with reference to FIG. 2, a suitable technique must be used to translate the received clutter echo signals into data which will be placed into clutter map cells for accurately indicating the clutter existing at the locations which correspond to the map cells. For consistency in the explanation of this invention and with the other angular spacings denoted thus far in this description, the angular spacing 54 between the arrows 50 and 52 is considered to be 0.8 degrees.

Figure 2:
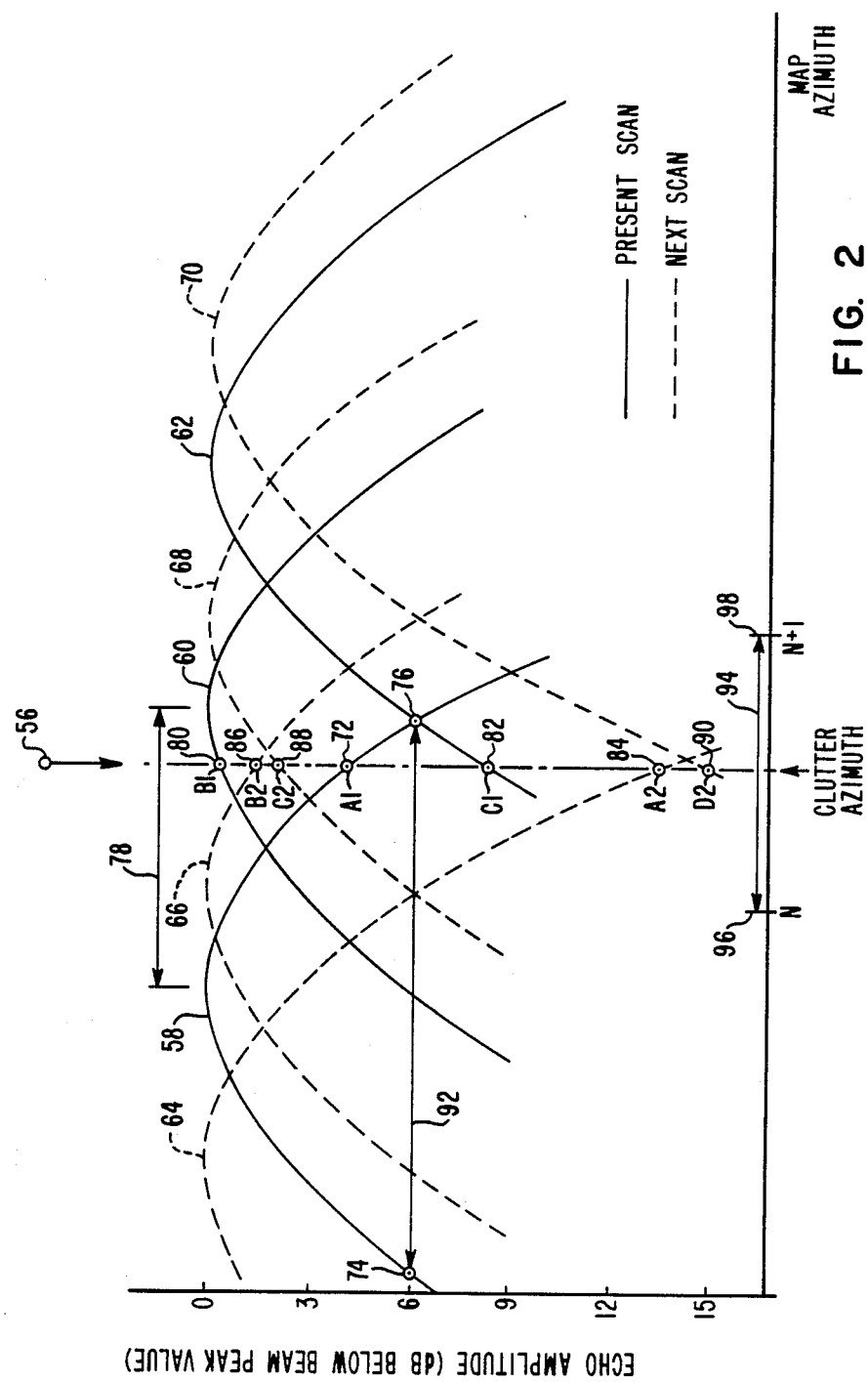
FIG. 2 is a diagram illustrating the reception of clutter signals for various antenna positions.

FIG. 2 is a diagram which illustrates the position of the beam pattern of the radar antenna during the reception of clutter signals from the clutter source 56. The antenna is assumed to be rotating in the direction which increases the azimuth from left to right. Since there is a delay in the time required for each successive data sample, the radar antenna is at a different azimuth for successive data inputs. The solid curves shown in FIG. 2 represent the azimuth and gain of the radar antenna during a scan of the radar antenna, herein denoted for clarity in this description as the "present" scan. The dashed lines indicate the azimuth and gain of the antenna during the "next" scan which would take place after the antenna has rotated approximately 360 degrees from the present scan. On the present scan, antenna patterns 58, 60 and 62 represent the successive positions of the antenna when data inputs are received from the clutter source 56. Antenna patterns 64, 66, 68 and 70 represent the position and gain of the radar antenna during successive data inputs on the next scan.

On the present or first scan, the clutter signal from the clutter source 56 is effectively seen by the antenna at point 72 on the pattern of curve 58, which is also designated at point A1. The 6 dB two-way beamwidth of the antenna can be represented, in angular azimuth dimensions, as the distance between points 74 and 76 on antenna pattern 58. Because of the constraint required for proper operation of the present invention which is based upon the Nyquist sampling criteria, successive data samples inputted to the radar system from the clutter source 56 occur after the antenna has moved in azimuth approximately one-half of its beamwidth. Such movement is represented by the difference 78 between the peaks of the antenna patterns 58 and 60. Consequently, the next data input to the radar system after point A1 occurs at point 80, which is additionally designated point B1. Since this data sample occurs at a time when the antenna is pointing more directly toward the clutter source 56, point 80 is at a location which has a higher gain than the point 72. As a result of the shift in the location of points 72 and 80 on the gain curve of the radar antenna, the signal received from the clutter 56 has a larger magnitude at point 80 than at point 72. As will be explained in more detail later, these differences in magnitude from the clutter source, which presumably has a constant radar cross-section must be processed or manipulated to determine the best estimate of the clutter value to be placed into the clutter map cells.

Proceeding with the data sample input characteristics shown in FIG. 2, it can be seen that the clutter signal is received for the next successive data input to the radar system at point 82, which is also designated as C1, on pattern 62. Points 72, 80 and 82 represent the significant inputs of data for the present scan of the radar antenna since, at other positions in the same scan, data inputs would enter the antenna at angles too great to be sufficiently amplified by the antenna gain, thus providing signals too weak to be of significance in the radar processing.

During the next scan of the radar antenna, the data inputs occur, successively, at points 84, 86, 88 and 90, also designated as points A1, B2, C2 and D2, respectively. All of the data inputs are spaced, in azimuth, approximately one-half of the beamwidth of the radar antenna. This also corresponds to approximately the spacing of the azimuth boundaries of the map cells. For consistency of this description, the antenna beamwidth 92 can be 1.6 degrees, the intervals at which the data samples are received, which is governed by the transmitted pulses and represented by separation distance 78, can be 0.8 degrees, and the distance 94, in azimuth, between adjacent map cells, can be 0.7 degrees.

In order to determine the correct value of clutter data input which must be inserted or stored into map azimuth N, located at azimuth position 96, the invention uses a technique which determines the desired input from data occurring when the antenna is pointed at azimuth directions which yield the most reliable data. The object of the technique of this invention is to determine a value for placement into the clutter map cell which would be obtained by the radar system antenna had it been pointing directly at the clutter source when the clutter signal was received.

According to this invention, a step in determining the proper value to be inserted into the map cell is to determine the larger of two adjusting values straddling the azimuth of the map cell being processed. The input of the map cell is equal to the larger of the two adjusting values straddling the map azimuth. These two values are each equal to the larger of the adjacent data samples plus a function of the larger minus the smaller data sample. In order to make calculations simpler and to increase the dynamic range of the system, it is assumed that data samples are available in log format.

By specific example, the value which would be used for map azimuth N would be equal to $B1 + f(B1 - A1)$ on the present scan. For the next scan, the input to map azimuth N would be equal to $B2 + f(B2 - A2)$. It is emphasized that the quantities calculated do not completely determine the value contained in the map cell under most ordinary circumstances. Usually, the values calculated or determined by this method adjust the existing value in the clutter map so that abrupt changes in the newly calculated cell value will not change the store cell value after just one scan. Thus, the existing value and the newly calculated value are weighted in such a manner that changes in the clutter echo for a particular cell must be consistent over several scans to affect the value stored in the map cell.

The above indicated inputs to map azimuth N are consistent with the criteria set forth for selecting the proper input since, on the present scan, B1 is the larger of the data samples, and $(B1 - A1)$ is the larger minus the smaller data sample. Similar analysis can be made for the quantities used for the next scan to determine the inputs to the map azimuth N. For the map azimuth N+1, represented by azimuth position 98 in FIG. 2, the input to the map would be equal to $B1 + f(B1 - C1)$ on the present scan. On the next scan, the input to the azimuth N+1 would be equal to $B2 + f(B2 - C2)$.

In each case, the f represents a function of the difference between the two values indicated. The value which is used in the expressions as a result of the function f can be derived from the graph of FIG. 3. For example, for the function of $(B2 - C2)$, a value of approximately 0.75 dB is used for addition to B2 since the difference is approximately 1 dB. In other words, entering the curve of FIG. 3 at a 1 dB signal difference provides a function of 0.75 dB. Also consistent with the method of determining the proper value to insert into the map cell, it is noted that $B2 + f(B2 - C2)$ is larger than $C2 + f(C2 - D2)$. It is emphasized that the curve of FIG. 3 is a function curve for one-half beamwidth sample spacing. The exact shape of the curve and the amount of the function derived from the curve beyond the 12 dB point can be changed without departing from the scope of the invention.

Once stored in the clutter map, the cell values must be retrieved for use in adjusting and controlling the clutter threshold levels. The adjusting quantity can be determined by using the value stored in the map cell closest to the clutter filter data, the larger or average in power, voltage, or log of the two stored values in map cells on each side of the filter data, or an estimate based upon three or more map cells located closest to the filter data.

In filters which suppress zero doppler, the detection threshold may be raised when the clutter map indicates the presence of clutter echoes which are too strong to be suppressed below the noise level. The clutter residue created by the scanning of the antenna extends over about two beamwidths since clutter on the skirts of the beam creates echoes which, although weak, are changing amplitude more rapidly than near the nose of the beam. Consequently, it is desirable to spread the effect of the peak measurement of clutter to adjacent azimuths.

The implementation of this method can be accomplished either with dedicated circuits or by software programs which manipulate the data as hereindescribed.

It is emphasized that numerous changes may be made in the above-described system within the scope of the invention. Since different embodiments of the invention may be made without departing from the spirit thereof, it is intended that all of the matter contained in the foregoing description, or shown in the accompanying drawings, shall be interpreted as illustrative rather than limiting.

I claim as my invention:

1. A method of processing signals in a radar system having a clutter map containing a plurality of range-azimuth cells for affecting the alarm threshold levels at range-azimuth locations scanned by the radar system antenna, said method comprising the steps of:
   transmitting a plurality of pulses within the time required for the radar system antenna to scan one beamwidth, said plurality of pulses and a change in interpulse period occurring asynchronously with the position of the scanning antenna;
   receiving return echoes corresponding to at least a first and a second grouping of said transmitted pulses within the time required for the radar system antenna to scan one beamwidth, said first and second groupings of transmitted pulses having different pulse repetition frequencies;

filtering said return echoes to determine the magnitude of clutter echoes returned by clutter and tangentially moving targets;

adjusting the stored values in the map cells with the determined magnitudes of the clutter echoes; and shifting the alarm threshold levels by an amount derived from the stored values in the map cells.

2. The signal processing method of claim 1 wherein the beamwidth of the antenna is defined by the points where the effective two-way antenna gain is 6 dB below its maximum gain.

3. The signal processing method of claim 1 wherein the filtering of the return echoes isolates echoes having substantially zero doppler shift and converts these echoes into magnitude values.

4. The signal processing method of claim 1 wherein the adjusting step also includes the steps of:

determining the magnitude of first and second adjusting values; and modifying the stored value in a particular map cell with the larger of said first and second adjusting values.

5. The signal processing method of claim 4 wherein the step of determining the magnitudes of said first and second adjusting values includes the steps of:

selecting the clutter echo, from two successive azimuth samples, which has the larger magnitude; and adding to the log magnitude of the selected clutter echo a value which is a function of the difference between the log magnitudes of said two successive azimuth samples.

6. The signal processing method of claim 5 wherein said function decreases the amount of difference added to the log magnitude of the selected clutter echo as the difference increases from zero to a first predetermined difference value, and increases the amount of difference as the difference increases from said first predetermined difference value to a second predetermined difference value.

7. The signal processing method of claim 6 wherein said function keeps the difference value which is added to the log magnitude of the selected clutter echo constant as the difference increases above said second predetermined difference value.

8. The signal processing method of claim 7 wherein the first predetermined difference value is 6 dB and the second predetermined difference value is 12 dB.

9. The signal processing method of claim 5 wherein said function is dependent upon the antenna beamwidth and the azimuth spacing of the clutter echoes.

10. The signal processing method of claim 1 wherein the amount derived from the stored values in the map cells is equal to the values stored in the map cell closest to the azimuth location for which the threshold level is being shifted.

11. The signal processing method of claim 1 wherein the amount derived from the stored values in the map cells is equal to the larger of the values in the two map cells on each side of the azimuth location for which the threshold level is being shifted.

12. The signal processing method of claim 1 wherein the amount derived from the stored values in the map cells is equal to the average of the values in the map cells closest to the azimuth location for which the threshold level is being shifted.

13. The signal processing method of claim 1 wherein the amount derived from the stored values in the map cells is an estimate based upon the values stored in at least the three map cells closest to the azimuth location for which the threshold level is being shifted.

14. The signal processing method of claim 1 wherein the clutter map provides a first output for shifting the alarm threshold levels in filters which pass the clutter echoes, and a second output for shifting the alarm threshold levels in filters which attenuate the clutter echoes.

15. A method of processing signals in a radar system having a clutter map which contains a plurality of range-azimuth cells, said processing method affecting the alarm threshold levels at range-azimuth locations scanned by the radar system antenna, said method comprising the steps of:

transmitting at least first and second bursts of pulses within the time required for the antenna to scan its 6 dB two-way beam width, said first and second pulse bursts having different pulse repetition frequencies, and said pulse bursts being transmitted asynchronously with the position of the scanning antenna;

receiving return echoes corresponding to said first and second burst of pulses;

determining the magnitude of clutter echoes returned by clutter and tangentially moving targets from two samples at the same range closest to the azimuth of a particular map cell;

selecting the clutter echo which has the larger magnitude;

adding to the log magnitude of the selected clutter echo, to provide an adjusting value, a value which is derived from the difference between the log magnitudes of said two samples;

changing the stored value in said particular map cell with said adjusting value; and shifting the alarm threshold level by an amount derived from the stored value in said particular map cell.

* * * * *